United States Patent [19]

SanGregory et al.

[11] Patent Number: 5,432,576
[45] Date of Patent: Jul. 11, 1995

[54] APERTURE MECHANISM HAVING A BLADE POSITIONABLE IN AN OPEN POSITION BY A HARD STOP

[75] Inventors: Jude A. SanGregory, Spencerport; James R. Kavanaugh, Henrietta, both of N.Y.

[73] Assignee: Eastman Kodak Company, Rochester, N.Y.

[21] Appl. No.: 177,668

[22] Filed: Jan. 5, 1994

[51] Int. Cl.$^6$ .......................... G03B 9/02; G03B 9/08
[52] U.S. Cl. .................... 354/230; 354/234.1; 354/271.1; 354/274
[58] Field of Search ................ 354/228–231, 354/234.1, 250, 271.1, 274

[56] References Cited

U.S. PATENT DOCUMENTS

| Re. 25,635 | 9/1964 | Nerwin | 354/438 |
|---|---|---|---|
| 3,233,531 | 2/1966 | Fairbank | 354/438 |
| 3,405,624 | 10/1968 | Peterson | 354/250 X |
| 4,112,450 | 9/1978 | Kondo | 354/235.1 |
| 4,760,420 | 7/1988 | Lam | 354/230 X |
| 4,797,700 | 1/1989 | Tsuji et al. | 354/271.1 |
| 4,893,142 | 1/1990 | Ishida et al. | 354/234.1 |
| 5,255,037 | 10/1993 | Kobayashi | 354/274 X |
| 5,337,110 | 8/1994 | Dowe | 354/230 |

FOREIGN PATENT DOCUMENTS

1407256 9/1975 United Kingdom .
1591496 6/1981 United Kingdom .

Primary Examiner—Michael L. Gellner
Assistant Examiner—J. K. Han
Attorney, Agent, or Firm—David A. Howley

[57] ABSTRACT

An aperture mechanism includes at least one blade moveable along a path between a closed position and at least one open position. At least one hard stop is moveable between a first position, out of the blade path, and a second position in the blade path to position the blade in the open position when an edge of the blade contacts the hard stop. The hard stop is located out of a plane of movement of the blade when the hard stop is in the first position to simplify and make more accurate the positioning of the blade in the open position.

11 Claims, 8 Drawing Sheets

APERTURE MECHANISM HAVING A BLADE POSITIONABLE IN AN OPEN POSITION BY A HARD STOP

FIELD OF THE INVENTION

This invention relates generally to the field of photography, and, more particularly, to an aperture mechanism having an aperture blade positionable in an open position by a hard stop.

BACKGROUND OF THE INVENTION

U.S. Pat. No. 4,760,420, which issued on Jul. 26, 1988 in the name of Lam, discloses a shutter mechanism for a camera having overlapping plates which are pivotally mounted and connected by a pin sliding in slots in the plates so that the plates move in unison. Springs bias the plates to an overlapping position, covering a hole in the camera body which leads to a lens. One of the plates is struck by a lever which urges the plates against springs causing them to pivot away, until the lever strikes a stop at which point the plates still overlap sufficiently to cover the hole. After the lever strikes the stop the plates continue to move under their own momentum to open up an aperture bound by the edges.

A magnetic control plate with pawls is attracted towards the overlapping plates by an electromagnet so that the pawls engage racks on the plates to arrest the plates at a particular aperture setting. A light metering device or optical sensor is used to determine the position of the plates and thereby to control energization of the electromagnet. The inertia of the magnetic control plate requires that the electromagnet must be energized slightly before the desired aperture size is reached. The electromagnet is switched off, releasing the plates which close the aperture under the action of the springs.

PROBLEMS TO BE SOLVED BY THE INVENTION

The shutter mechanism disclosed in the Lam reference necessitates a precise determination of when the desired aperture position is reached so that a pulse can be applied to the electromagnet at the correct moment. Edges 31, 32 of control plate 24 are always located in the plane of movement of the plates. Plate position must be known so that edges 31, 32 of control plate 24 will engage between the correct teeth on the plate racks. Determination of the aperture position is accomplished by using a light metering device or optical sensor to determine the position of the plates. Having to determine the position of the plates, factor in the inertia of the magnetic control plate and energize the electromagnet at precisely the correct moment greatly complicates and increases the cost of such a shutter mechanism. As the system ages and parts wear, the shutter mechanism may not be able to position the plates in the correct aperture position.

SUMMARY OF THE INVENTION

According to one aspect of the invention, an aperture mechanism includes at least one aperture blade moveable along a path between a closed position and at least one open position. At least one hard stop is moveable between a first position, out of the blade path, and a second position in the blade path to position the blade in the open position when an edge of the blade contacts the hard stop. The hard stop is located out of a plane of movement of the blade when the hard stop is in the first position to simplify and make more accurate the positioning of the blade in the open position.

ADVANTAGEOUS EFFECTS OF THE INVENTION

By positioning the hard stop out of the plane of movement of the blade, the present aperture mechanism is greatly simplified. There is no need to determine the position of the blade prior to moving the hard stop from its first position to its second position. As soon as the desired aperture size is determined, the appropriate hard stop can be moved to its second position. Further, the inertia of the hard stop need not be considered in determining when to start moving the hard stop between its first and second positions. As such, the present aperture mechanism is greatly simplified over the shutter mechanism disclosed in Lam while at the same time providing increased accuracy of blade placement and a more robust system.

DETAILED DESCRIPTION OF THE INVENTION

The invention is disclosed as being embodied preferably in an aperture/shutter mechanism. Because the features of an aperture/shutter mechanism are generally known, the description which follows is directed in particular only to those elements forming part of or cooperating directly with the disclosed embodiment. It is to be understood, however, that other elements may take various forms known to a person of ordinary skill in the art.

Figure 1:
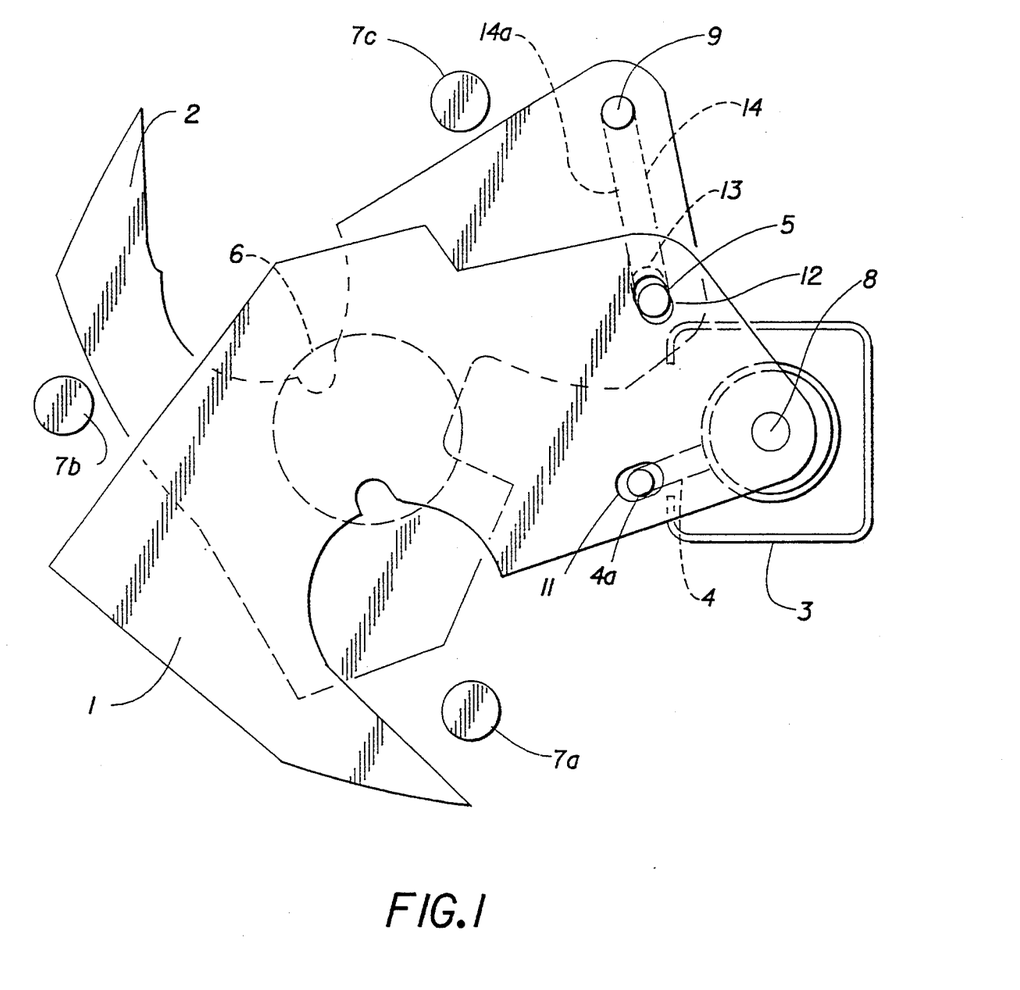
FIGS. 1–5 are top views of the aperture mechanism of the present invention with aperture blades shown in various positions.
Figure 2:
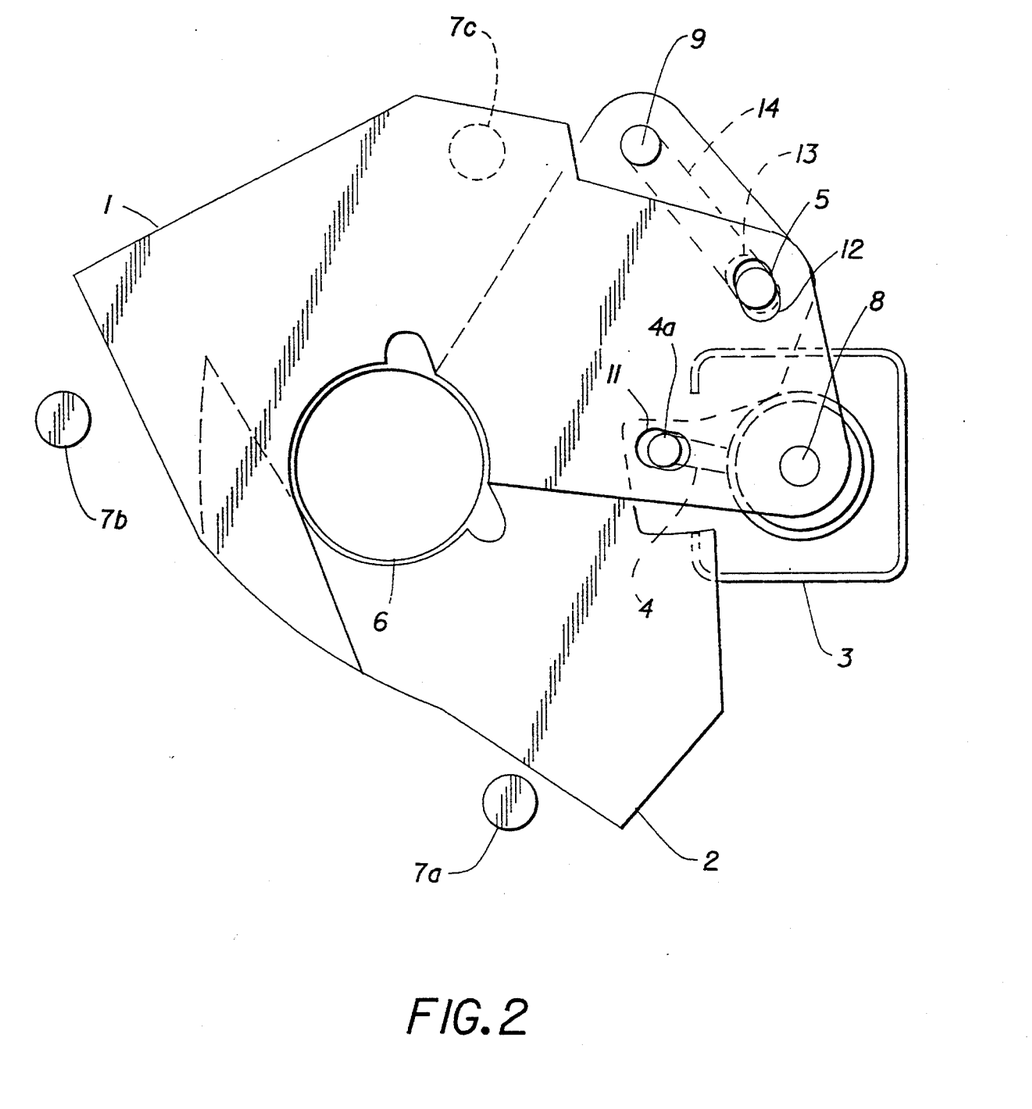

Referring now to the drawings, FIGS. 1 and 2 show top views of one embodiment of the present invention. A pair of aperture blades 1,2 are displayed in a closed position in FIG. 1. In this position, blades 1 and 2 block light from passing through camera aperture 6. FIG. 2 shows the same blades in the fully opened position (aperture 6 is fully uncovered). An actuator 3, used to rotate blade 1, includes an arm 4 to which is connected a pin 4a that fits through a slot 11 in blade 1. A pivot point 8 for blade 1 lies along the axis of rotation for actuator 3. Thus, blade 1 directly follows the rotation of actuator 3.

A link 14 acts as a pivot point for blade 2 at a position 9. Link 14 includes a pin 5 and an arm 14a to which the pin is connected. Pin 5 fits through slots (apertures) 12 and 13 of blades 2 and 1 respectively, thus rotating with blade 2 as it causes blade 2 to follow the motion of blade 1 at this point. It can be seen that as blade 1 rotates clockwise blade 2 is caused to rotate counter clockwise and visa versa.

Actuator 3 is preferably a rotary magnetic actuator or solenoid. Magnetic attraction torque within actuator 3 keeps the blades rotated to the closed condition when the actuator is not energized. Energizing actuator 3 to rotate clockwise drives the blades opened, as described above. Energizing actuator 3 to turn counter-clockwise returns the blades to the closed condition after proper exposure.

Figure 3:
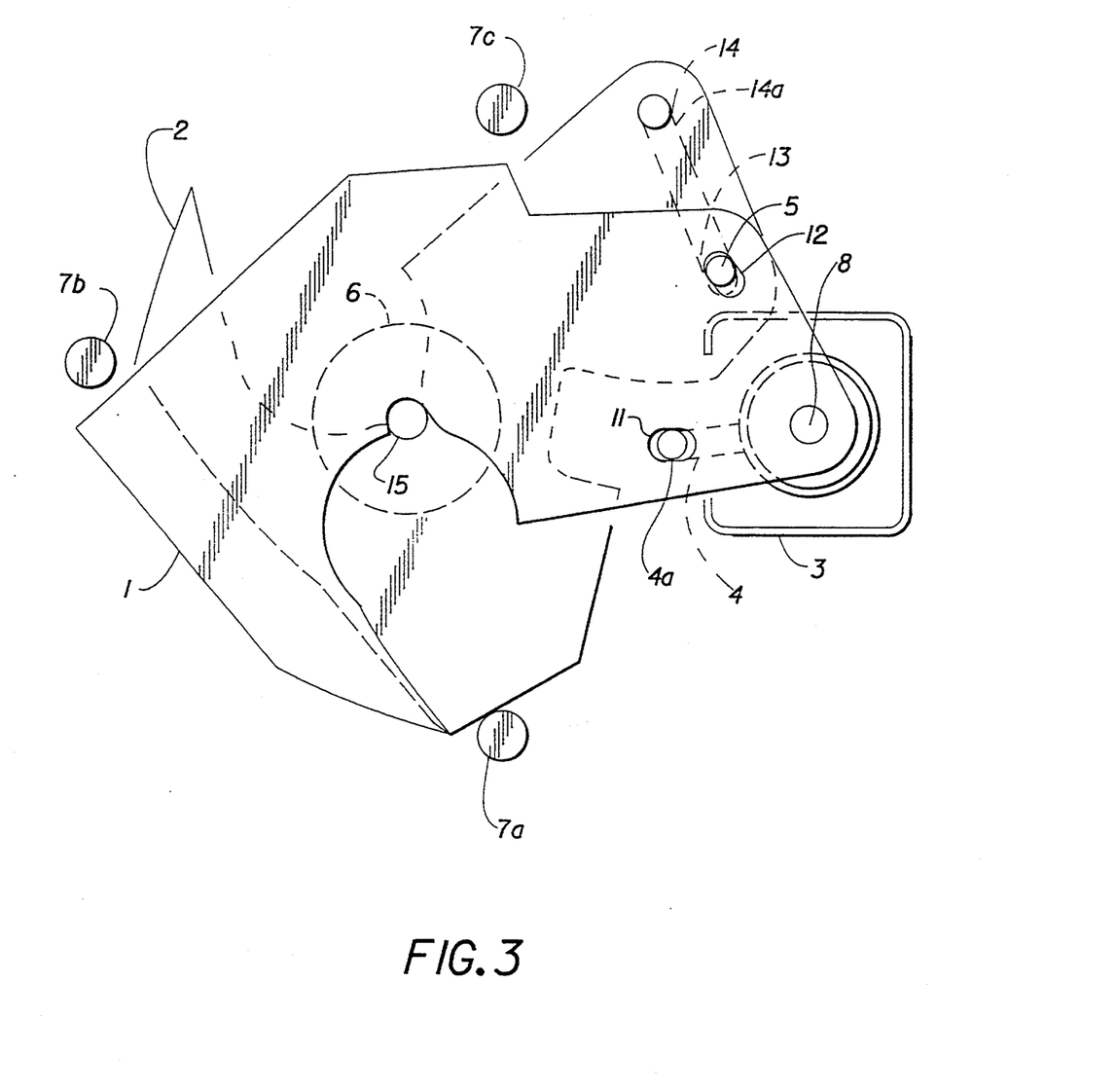
Figure 4:
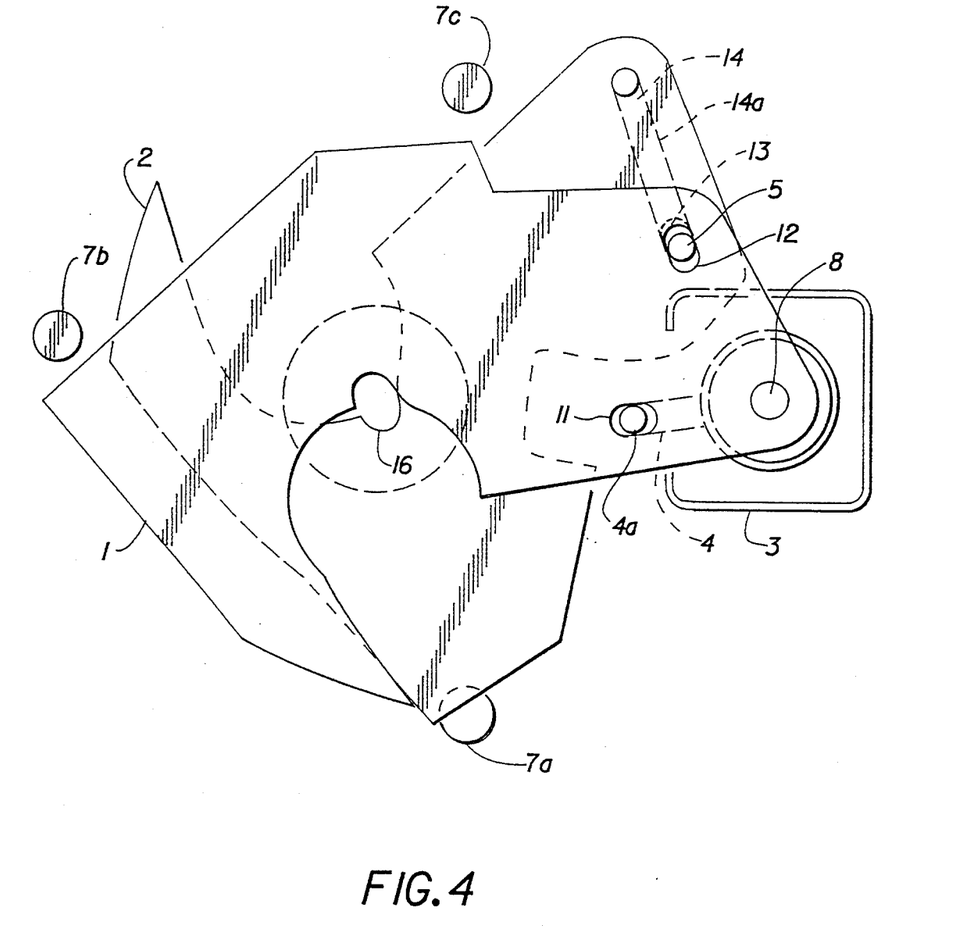
Figure 5:
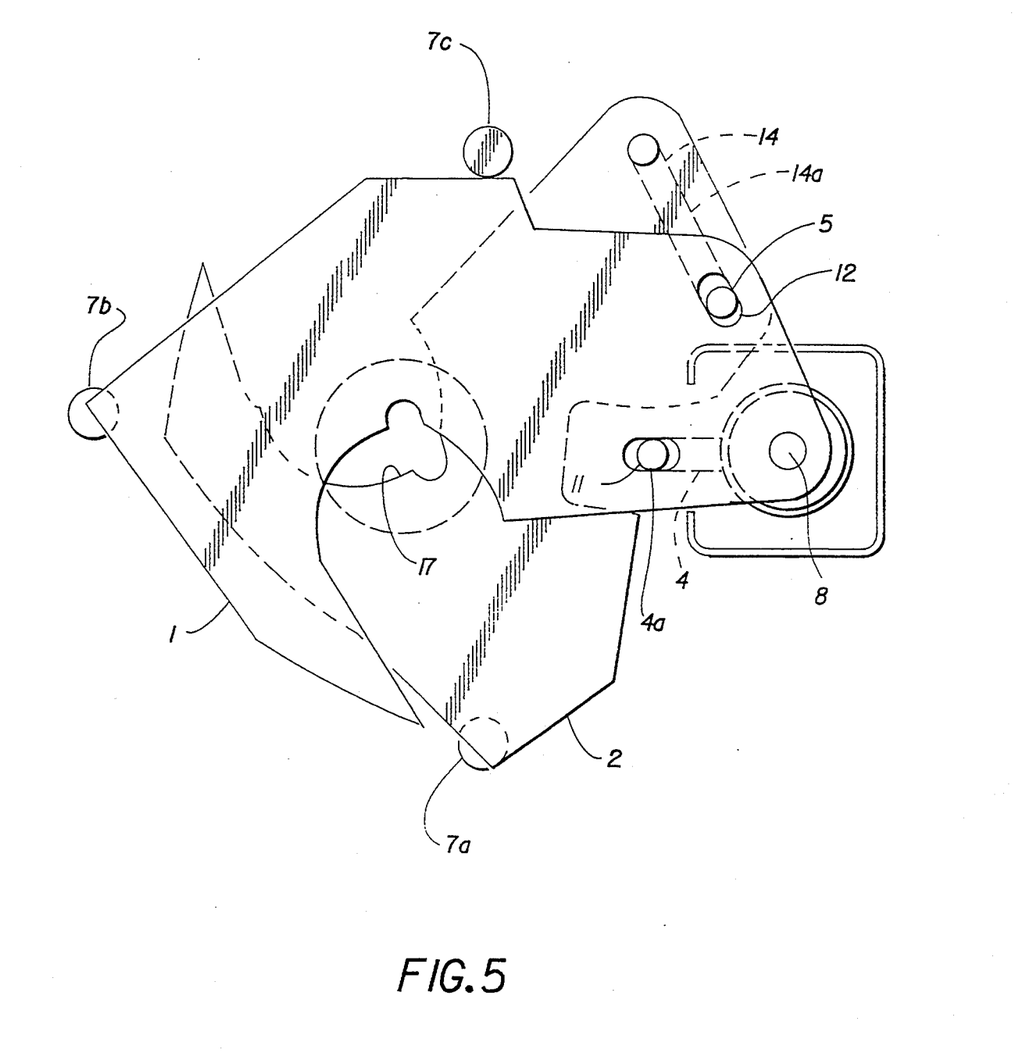

The present invention varies aperture size by using moving hard stops to position the blades at discrete degrees of travel. FIGS. 3, 4 and 5 show the shutter opened to three intermediate apertures (arm 4, pins 4a and 5, and link 14 are not shown in these drawings). In FIG. 3, a hard stop 7A, normally out of a plane of rotation of blade 2, is placed in the path of blade 2 to stop the shutter from further opening. Thus, the blades together form an exposure aperture area 15. The geometry of blades 1,2 and the position of hard stops 7a–c are selected to minimize bounce of the blades when they strike the hard stop, In FIG. 4, a hard stop 7B blocks the path of blade 1, thus exposing an area 16. Pin 7A is not placed in the path of blade 2 in this case or else the blades would stop as shown in FIG. 3. In FIG. 5, a pin 7C stops the shutter to expose area 17. Again, the other two pins are not employed for this condition and are located out of the plane of rotation of their respective blades.

The hard stops described in the previous paragraph are preferably made of a permanent magnetic material. These hard stops are moved into the shutter blade path by a magnetic force from nearby coils which are selectively energized. One magnetic hard stop and coil combination is used for each partial aperture (one less set than the total number of apertures).

Figure 6:
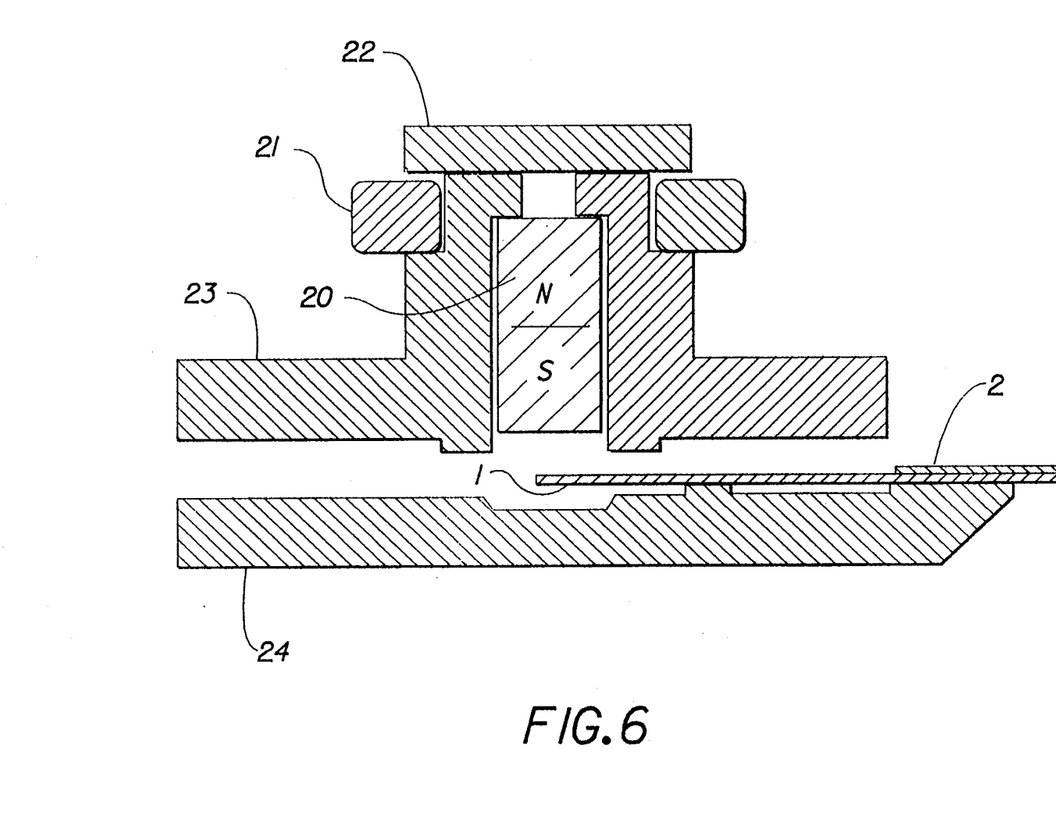
FIGS. 6 and 7 are side sectional view of a mechanism used to position a hard stop into and out of a blade path.

FIG. 6 is a cross section through one of these hard stop positioning mechanisms in the deenergized state. A permanent magnet 20 is held in position by magnetic attraction to a steel plate 22. Steel plate 22 is located above each coil and magnet. To reduce part count and cost, one large steel plate 22 can cover all the magnet-coil assemblies. Shutter blades 1 and 2 operate between plastic shutter housing parts 23 and 24 and are unaffected by magnet 20. A coil 21 is wrapped around the centerline of magnet 20 but is not energized in this state.

Figure 7:
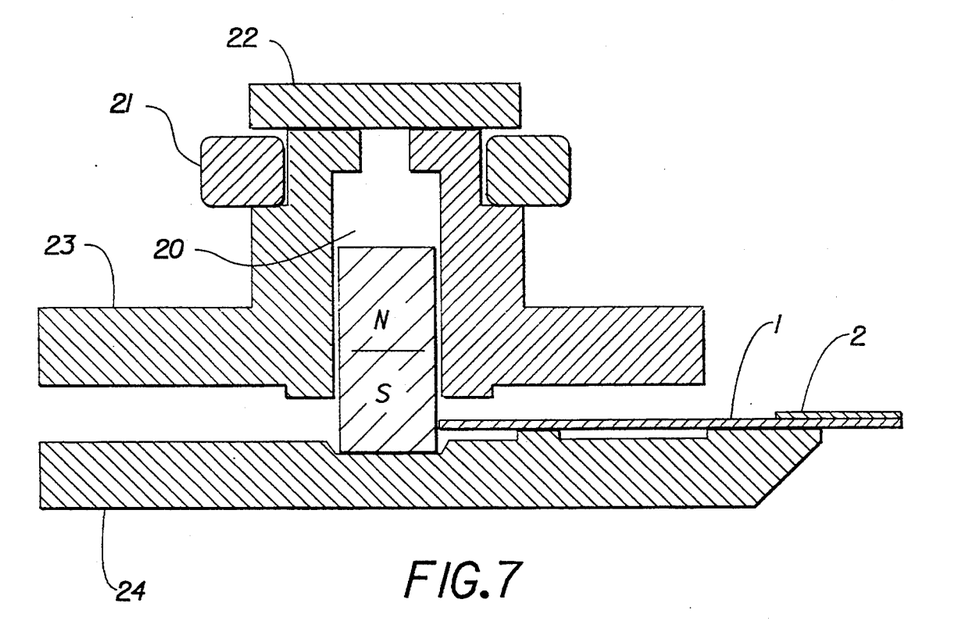
Figure 8:
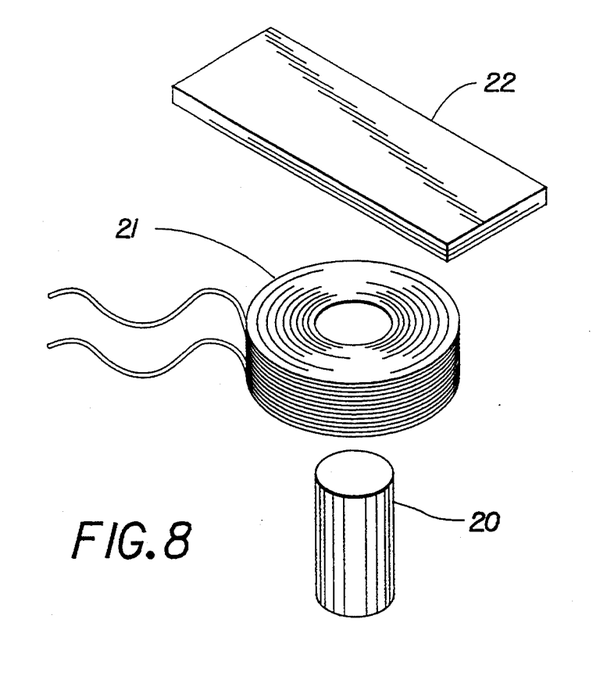
FIG. 8 is a perspective schematic view of the mechanism of FIGS. 6 and 7.

FIG. 7 shows the same hard stop positioning mechanism in the energized state. FIG. 8 is a perspective view of the key components 20, 21 and 22 in the energized state. When electric current passes through coil 21 in the correct direction, a magnetic field is created that moves magnet 20 until it stops at plate 24. In this position, magnet 20 stops blade 1 (thus blade 2) to create one of the aperture conditions shown in FIGS. 3, 4 and 5.

Since the force to stop the shutter blades acts perpendicular to the direction of magnet travel, minimal force is required to hold the magnet in position. The force needs only to be great enough to over-come the magnet's attraction to the steel plate 22, with some safety margin. The magnetic attraction to steel plate 22 need only be great enough to allow the magnet to return from the fully extended position to the initial position when the coil is de-energized. Obviously, coil 21 could be energized in the opposite direction to return the magnet to its initial position. However, this would require more expensive electronics with two directional drive.

Operation of the aperture/shutter mechanism occurs as follows. When a photographer depresses a camera trigger, an aperture decision is made by the camera electronics based on scene brightness information from a photo detector. One (or none) of the hard stop positioning mechanisms is energized depending on the aperture decision. After a brief time, to allow the hard stop positioning mechanism to settle, and with current still applied to the hard stop positioning mechanism, current is applied to shutter actuator 3 to open the blades and hold them open against the hard stop. Current remains on in both the shutter actuator and the stop actuator until the proper exposure time (as determined by the electronics) has elapsed. After this time, the hard stop positioning mechanism is de-energized and the shutter actuator is driven in the closing direction (or it can be deenergized if slower closing time can be tolerated). Thus both the stop mechanism and the shutter mechanism are returned to their initial positions, ready for another picture.

FIG. 6 and 7 show the preferred embodiment for the hard stop positioning mechanisms. Not only does steel plate 22 attract magnet 20, but it also increases the magnetic performance of coil 21. The plate acts similar to a mirror, reflecting the coil's magnetic field toward magnet 20. In this embodiment, coil 21 produces a repelling force to overcome the magnet's attractive force to plate 22. Obviously the positions of the components can be rearranged. For instance, the coil could be positioned at the lower end of magnet 20. In this configuration, the coil would be energized in the opposite direction to attract the magnet away from the steel plate. However, Because of greater distance from the coil, the steel plate would not amplify the coil strength as it does in the preferred embodiment.

Aperture/shutter mechanisms employing pins that drive blades through cam slots and holes, typically suffer from variability in aperture size due to pin-to-slot/hole clearances necessary for manufacturing. Errors in aperture size occur because the blades may settle to positions anywhere within the 10 pin-to-slot/hole clearance zone. This blade position variability problem is eliminated in FIG. 3 of the present invention because all moving parts are loaded against physical barriers at this aperture condition. Blade position variability is still present in FIGS. 2, 4 and 5 and is related to which blade is stopped by a hard stop to determine the aperture. All of the apertures would be without variability if blade 2 were stopped by the hard stops for all apertures.

Figure 9:
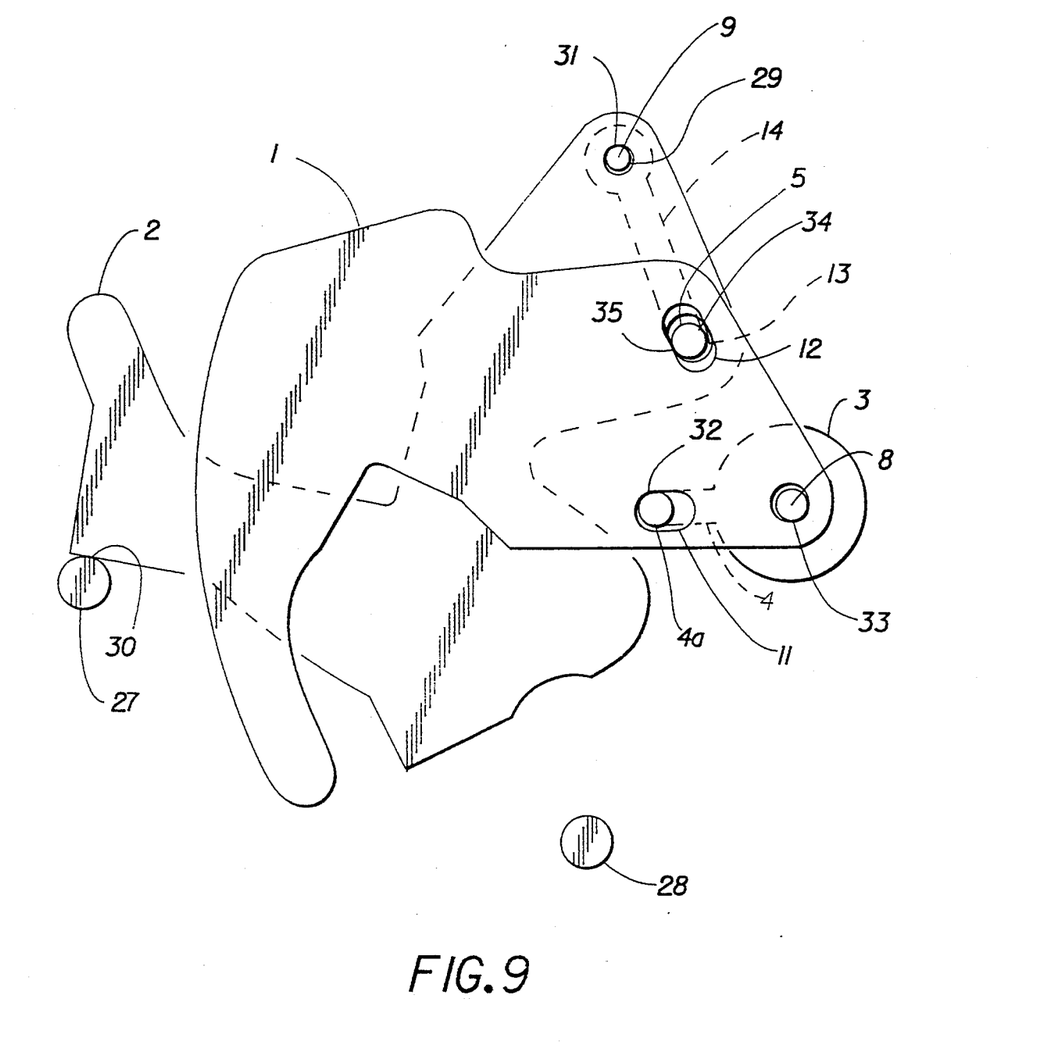
FIG. 9 is a top view of a second embodiment of the aperture mechanism of the present invention.

FIG. 9 represents a second embodiment of the present invention and will be used to explain how stopping blade 2 against a hard stop eliminates aperture variability. Only two hard stops are shown but more or less could be used. Blades 1 and 2 are shown open to their small aperture position. The blades are positioned at the aperture shown because blade 2 is stopped by hard stop 27. Actuator 3 is energized to rotate clockwise about axis 8, whereby pin 4a drives blade 1 in the same direction. Pin 5 of link 14 transmits motion from blade 1 to blade 2 through slots 13 and 12 of blades 1 and 2 respectively.

All moving parts are loaded to known positions in this state. Blade 2 is held against hard stop 27 at point 30 with the force transmitted from actuator 3 through blade 1 and link 14. Pivot hole 31 of blade 2 is loaded against pin 29 of link 14 at point 31. Slot 12 on blade 2 is loaded against pin 5 at point 34. Similarly, but not shown, pin 29 of link 14 is loaded to a known point against its bearings in the shutter housing, and hard stop 27 is loaded against its bearing hole in the shutter housing. Blade 2 is therefore completely locked to a known position against physical barriers.

The position of blade 1 is constrained at points 32, 33 and 35 in a similar manner. Actuator 3 provides torque that holds pin 4 against point 32 of slot 11 on blade 1. This torque also holds blade 1 against pin 5 of link 14 at point 35. Pin 5 is prevented from moving because it is in turn trapped by the stopped blade 2 at point 34 on slot 12. Not all of the pivot clearances have been shown, but all slop is biased out of the system in this condition. Any hard stop that stops blade 2 to define the aperture size will have the same effect on aperture variability.

If blade 1, the blade driven directly by actuator 3, were stopped by a hard stop, it would be loaded to a known position. However, blade 2 would be free to settle to any position within the clearances between link 14 and slots 12 and 13 of blades 2 and 1. Even more variation would be allowed if neither blade were loaded against a stop. This could occur, for instance, if an actuator drove both blades at slots 12 and 13 with a single pin, a method of driving aperture/shutter blades that is common for stepper motor driven shutters. The key to eliminating aperture variation using this method is to tie the blades together with a connecting member (link 14) and to determine the aperture size by driving the blade (blade 2) that is driven by this connecting member into a hard stop.

The invention has been described with reference to a preferred embodiment. However, it will be appreciated that variations and modifications can be effected by a person of ordinary skill in the art without departing from the scope of the invention.

| PARTS LIST FOR FIGS. 1-9 | |
|---|---|
| 1, 2 | Aperture Blades |
| 3 | Actuator |
| 4 | Arm |
| 4a, 5 | Pins |
| 6 | Aperture |
| 7a-c | Hard Stops |
| 8 | Pivot Point |
| 9 | Position |
| 11 | Slot |
| 12, 13 | Slots |
| 14 | Link |
| 14a | Arm |
| 15, 16, 17 | Aperture Area |
| 20 | Magnet |
| 21 | Coil |
| 22 | Steel Plate |
| 23, 24 | Plastic Shutter Housing Parts |
| 27, 28 | Hard Stops |
| 29 | Pin |
| 30, 32 | Point |
| 31 | Pivot Hole |
| 33-35 | Points |

What is claimed is:

1. An aperture mechanism comprising at least one blade moveable along a path between a closed position and at least one open position, and at least one hard stop moveable between a first position, out of the blade path, and a second position, in the blade path, to position the blade in the open position when an edge of the blade contacts the hard stop, characterized by:
   said hard stop being located out of a plane of movement of said blade when said hard stop is in said first position.

2. The aperture mechanism of claim 1, wherein said hard stop includes a permanent magnet which is moved between said first and second positions by being exposed to a magnetic field.

3. The aperture mechanism of claim 1, wherein said hard stop moves in a direction perpendicular to said plane of movement of said blade when said hard stop moves between said first and second positions.

4. The aperture mechanism of claim 1, further including means for rotating said blade about an axis of rotation between said open and closed positions, said rotating means including a pin which extends through an opening in said blade and an arm to which said pin is connected, said arm being rotated about said axis of rotation of said blade by said rotating means to cause said blade to rotate.

5. The aperture mechanism of claim 4, further including a second blade and a linking mechanism for linking the movement of said blades together, said blades each having an aperture, said linking mechanism including an arm connected to a pin which extends through both blade apertures, said arm being rotatable about an axis of rotation of said second blade.

6. The aperture mechanism of claim 5, wherein said hard stop is in the path of said second blade when said hard stop is in said second position.

7. The aperture mechanism of claim 6, including a plurality of hard stops which are each individually positionable in the path of said second blade, only one of said hard stops being positioned in the path of said second blade at a time.

8. The aperture mechanism of claim 1, further including a second blade and a linking mechanism for linking the movement of said blades together, said blades each having an aperture, said linking mechanism including a pin which extends through both blade apertures and an arm to which said pin is connected, said arm being rotatable about an axis of rotation of one of said blades.

9. The aperture mechanism of claim 1, including a plurality of hard stops used to position said blade in a plurality of open positions, only one of said hard stops being positioned in said second position at a time.

10. The aperture mechanism of claim 9, further including a second blade moveable between a closed position and at least one open position, each blade being contactable by at least one of said hard stops.

11. An aperture mechanism, comprising: a blade rotateable between a closed position and at least one open position;
   means for rotating said blade about an axis of rotation between said open and closed positions, said rotating means including a pin which extends through an opening in said blade and an arm to which said pin is connected, said arm being rotated about said axis of rotation of said blade by said rotating means to cause said blade to rotate;
   a second blade; and
   a linking mechanism for linking the movement of said blades together, said blades each having an aperture said linking mechanism including an arm connected to a pin which extends through both blade apertures, said arm being rotatable about an axis of rotation of said second blade.

* * * * *